(12) United States Patent
Yokoyama

(10) Patent No.: US 12,742,945 B2
(45) Date of Patent: Sep. 22, 2026

(54) STEREOSCOPIC OPTICAL SYSTEM AND IMAGE PICKUP APPARATUS

(71) Applicant: CANON KABUSHIKI KAISHA, Tokyo (JP)

(72) Inventor: Takayoshi Yokoyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 680 days.

(21) Appl. No.: 18/066,349

(22) Filed: Dec. 15, 2022

(65) Prior Publication Data

US 2023/0251460 A1 Aug. 10, 2023

(30) Foreign Application Priority Data

Jan. 18, 2022 (JP) ................................ 2022-005462

(51) Int. Cl.
*G02B 27/22* (2018.01)
*G02B 9/12* (2006.01)
*G02B 13/18* (2006.01)
*G02B 30/34* (2020.01)
*G03B 35/08* (2021.01)

(52) U.S. Cl.
CPC ............... *G02B 9/12* (2013.01); *G02B 13/18* (2013.01); *G02B 30/34* (2020.01); *G03B 35/08* (2013.01)

(58) Field of Classification Search
CPC ........ G02B 23/00; G02B 23/02; G02B 23/12; G02B 23/125; G02B 23/14; G02B 23/18; G02B 23/24; G02B 23/2407; G02B 23/2415; G02B 3/00; G02B 3/20; G02B 3/22; G02B 3/26; G02B 3/30; G02B 3/32; G02B 3/34; G02B 3/35; G02B 3/60
USPC ................................................. 359/399–482
See application file for complete search history.

(56) References Cited

U.S. PATENT DOCUMENTS 8,687,045 B2 * 4/2014 Iwasaki ................ H04N 13/218 348/46
8,814,779 B2 * 8/2014 Shafer ................ A61B 1/00194 348/45
12,422,653 B2 * 9/2025 Sugiyama ............. G02B 30/26
(Continued)

FOREIGN PATENT DOCUMENTS

CN 111694144 A * 9/2020
JP 2012003022 A 1/2012
(Continued)

OTHER PUBLICATIONS

Notice of Reasons for Refusal issued by the Japanese Patent Office on Nov. 25, 2025 in corresponding JP Patent Application No. 2022-005462, with English translation.

*Primary Examiner* — Thong Q Nguyen
(74) *Attorney, Agent, or Firm* — Carter, DeLuca & Farrell LLP

(57) ABSTRACT

An stereoscopic optical system includes two parallel optical systems arranged in parallel for a single common image sensor. Each optical system has an angle of view in which an image of another optical system is formed in a first area at an outer peripheral portion in an image circle, and includes a field stop in a second area at an inner peripheral portion in the image circle. A distance between centers of the image circles of the two optical systems is shorter than a diameter of each image circle on the image sensor, and at least part of each first area is located outside the image sensor.

10 Claims, 11 Drawing Sheets

(56) References Cited

U.S. PATENT DOCUMENTS

2020/0014908 A1* 1/2020 Ebe .......................... G02B 9/12
2022/0221688 A1 7/2022 Yokoyama et al.

FOREIGN PATENT DOCUMENTS

JP 2014-038397 * 8/2016
JP 2020-008629 A 1/2020
JP 2021-177237 * 11/2021
JP 2021177237 A 11/2021

* cited by examiner

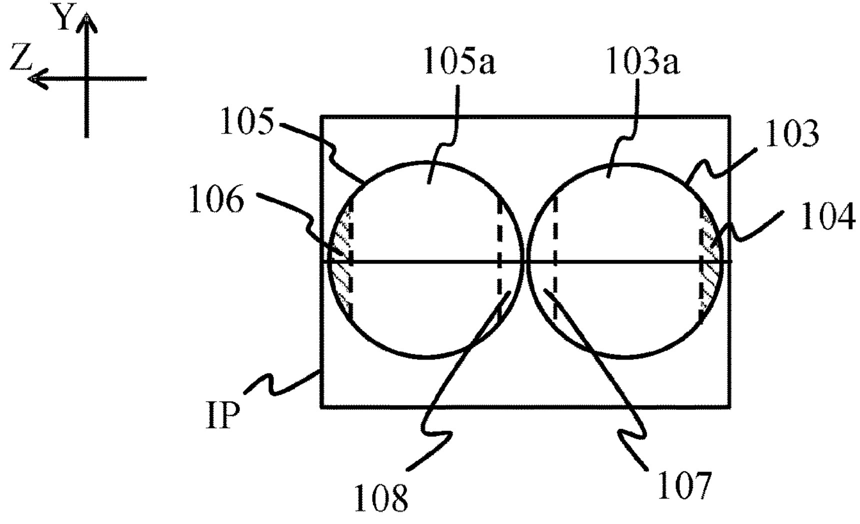
FIG. 12
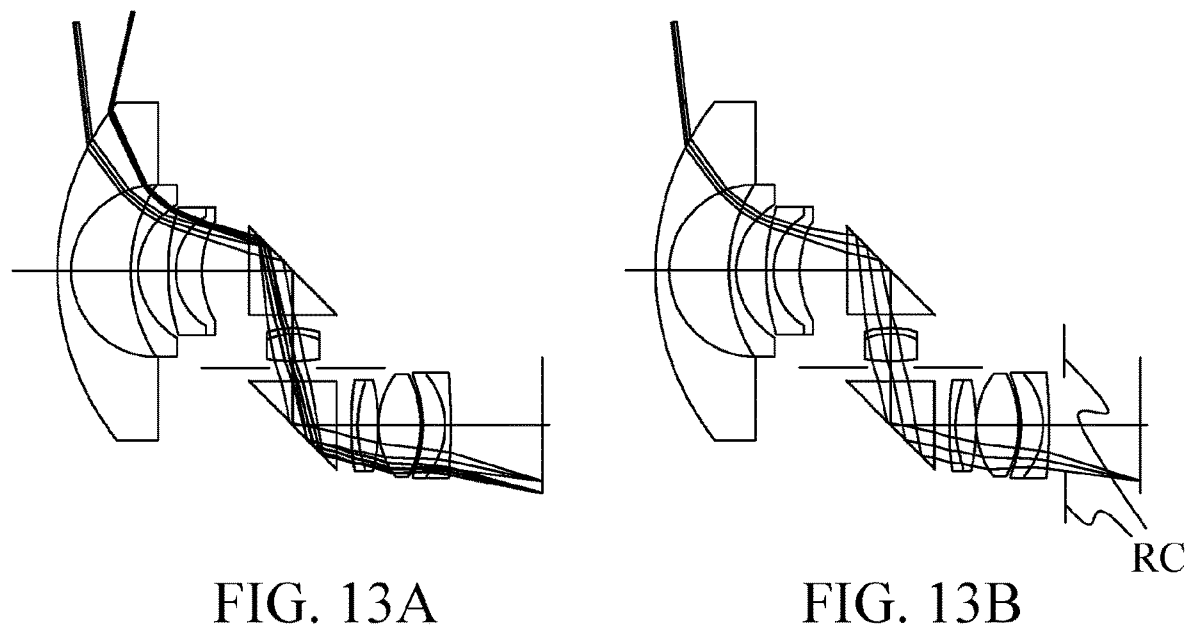
FIG. 13A
FIG. 13B

STEREOSCOPIC OPTICAL SYSTEM AND IMAGE PICKUP APPARATUS

BACKGROUND

Technical Field

One of the aspects of the disclosure relates to an optical system and an image pickup apparatus, each of which is used for stereoscopic imaging.

Description of the Related Art

In a case where a user acquires by imaging left and right parallax images that are three-dimensionally viewable (observable) with both eyes through an image display apparatus such as a head mount display (HMD), an optical system for stereoscopic imaging is used which includes two, i.e., left and right optical systems that are arranged in parallel. Japanese Patent Laid-Open No. ("JP") 2020-008629 discloses a stereoscopic optical system that can capture left and right parallax images through two left and right optical systems, each of which includes a fisheye lens. This stereoscopic optical system bends an optical path of each optical system so that a distance (interval) between the optical axes at image-side portions of the left and right optical systems can be narrower than that at object-side portions of the left and right optical systems and the image circles of the left and right optical systems can be accommodated within a single image sensor. Stereoscopic imaging is available by attaching this stereoscopic optical system to a normal lens interchangeable type image pickup apparatus having a single image sensor.

In order to accommodate the image circles of the left and right optical systems in the single image sensor as in the stereoscopic optical system disclosed in JP 2020-008629, it is necessary to make smaller the image circle of each optical system than that a case where one image sensor is prepared for each optical system. As a result, the number of pixels in an image acquired by imaging is reduced, and image quality is limited.

In a case where each of the left and right optical systems includes a fisheye lens, stray light generated in one optical system may be reflected in the image circle of the other optical system and lower the image quality.

SUMMARY

One of the aspects of the disclosure provides a stereoscopic optical system that includes two optical systems arranged in parallel and can provide high image quality.

A stereoscopic optical system according to one aspect of the disclosure includes two optical systems arranged in parallel and is configured to form image circles of the two optical systems on a single image sensor. Each of the two optical systems has an angle of view in which an image of another optical system is formed in a first area at an outer peripheral portion in an image circle in a parallel arrangement direction of the two optical systems. Each of the two optical systems includes a field stop configured to reduce a light amount in a second area at an inner peripheral portion of the image circle in the parallel arrangement direction. A distance between centers of the image circles of the two optical systems is shorter than a diameter of each image circle on the image sensor, and at least part of each first area is located outside the image sensor. An image pickup apparatus having the above stereoscopic optical system also constitutes another aspect of the disclosure.

Further features of the disclosure will become apparent from the following description of exemplary embodiments with reference to the attached drawings.

BRIEF DESCRIPTION OF THE DRAWINGS

FIG. 12 illustrates an area of an image circle that is not suitable for viewing.

FIG. 13A illustrates an optical system without a field stop, and 13B illustrates an optical system with a field stop.

DESCRIPTION OF THE EMBODIMENTS

Referring now to the accompanying drawings, a description will be given of examples of the disclosure. First, prior to a specific description of Examples 1 to 3, matters common to each example will be described.

A stereoscopic optical system according to each example is provided in an interchangeable lens that is attached to and detachable from various image pickup apparatuses that include an image sensor, such as a digital camera, a video camera, a broadcasting camera, and a surveillance camera. The stereoscopic optical system according to each example may be integrated with the image pickup apparatus.

Figure 11:
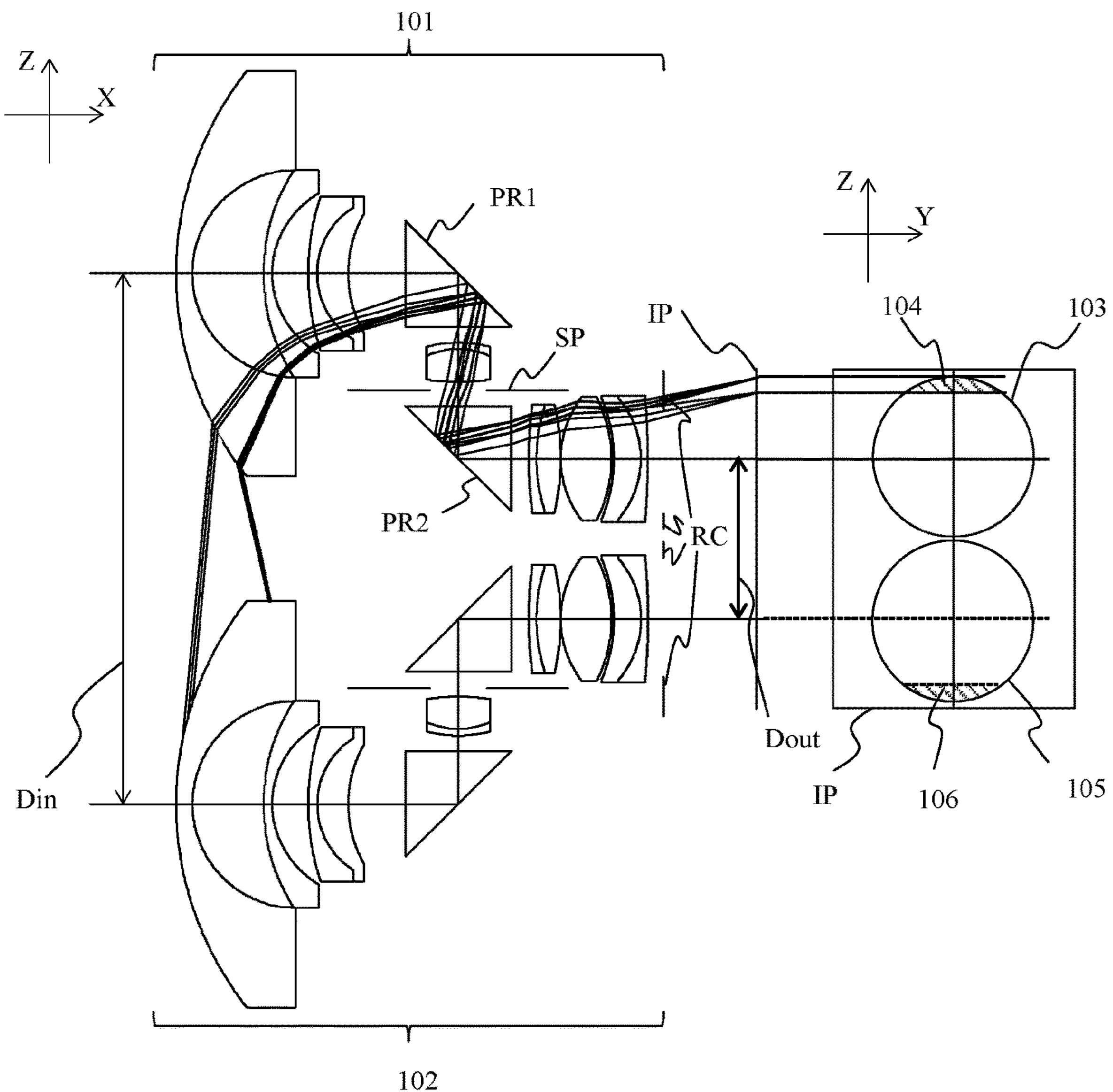
FIG. 11 illustrates an area of an image circle of one optical system in which stray light from the other optical system is reflected.

The stereoscopic optical system according to each example includes two optical systems (right-eye optical system and left-eye optical system) 101 and 102 that are arranged in parallel in a Z direction, as illustrated in FIG. 11. In FIG. 11, a left side is an object side (front side), and a right side is an image side (rear side). An X direction indicates an optical axis direction along which an optical axis of each optical system (indicated by a solid line) extends. An image plane IP viewed from the object side is illustrated on right portion of FIG. 11. A single (common) image sensor (imaging plane) indicated by a rectangular frame in FIG. 11 is disposed on the image plane IP. The image sensor has a rectangular shape with long sides extending in the Z direction and short sides extending in a Y direction. Image circles 103 and 105 of the two optical systems 101 and 102 are formed on the image sensor. In each example, an image circle is defined as an area from a (center) position where a light amount is 1 on the optical axis of each optical system to a peripheral edge where the light amount is 0.

Each of the two optical systems 101 and 102 has an angle of view such that an image of the other (adjacent) optical system is formed in first areas 104 and 106 at outer peripheral portions in the image circles 103 and 105 in the Z direction (parallel arrangement direction). More specifically, it has an angle of view of 180° or more. Thereby, it is possible to obtain an image with an imaging area that covers a field of view of a viewer (observer) who views it through an image display apparatus such as an HMD, as an image generated from an output of the image sensor, and the viewer can be provided with a highly realistic image.

Each of the two optical systems 101 and 102 includes a field stop RC. The field stop RC is provided to reduce a light amount in second areas 107 and 108 at inner peripheral portions in the image circles 103 and 105 in the Z direction. The field stop RC may reduce the light amount in the second area in comparison with a case where there is no field stop, and the light amount in the second area may not necessarily be zero. Areas between the first areas 104 and 106 and the second areas 107 and 108 in the image circles 103 and 105 are third areas **103*a* and 105*a*** suitable for imaging (image viewing or observation).

Figure 16:
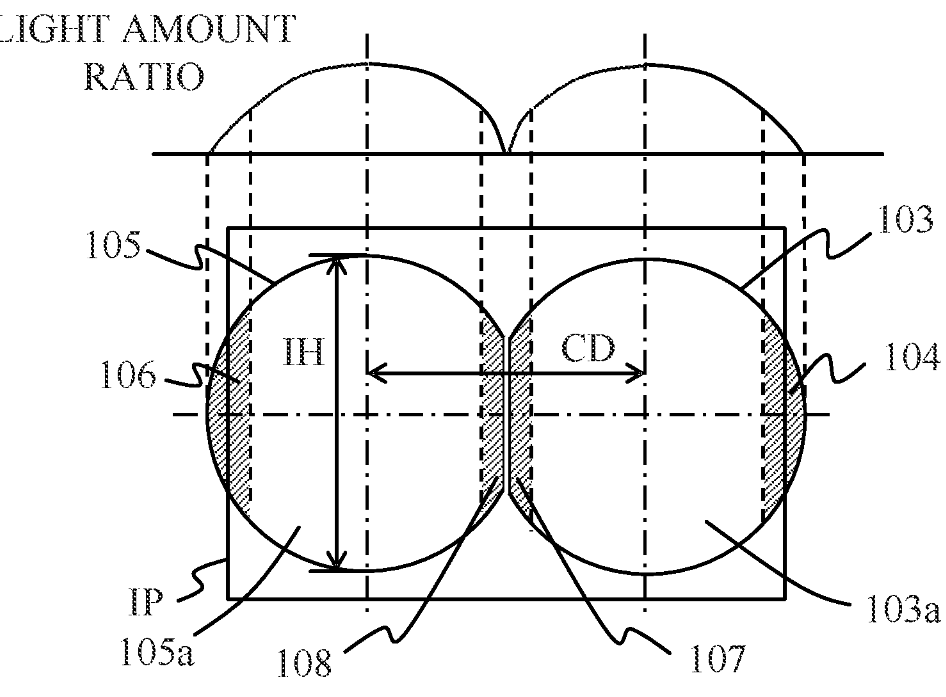
FIG. 16 illustrates an image circle on an image sensor, as a second instance.
Figure 17:
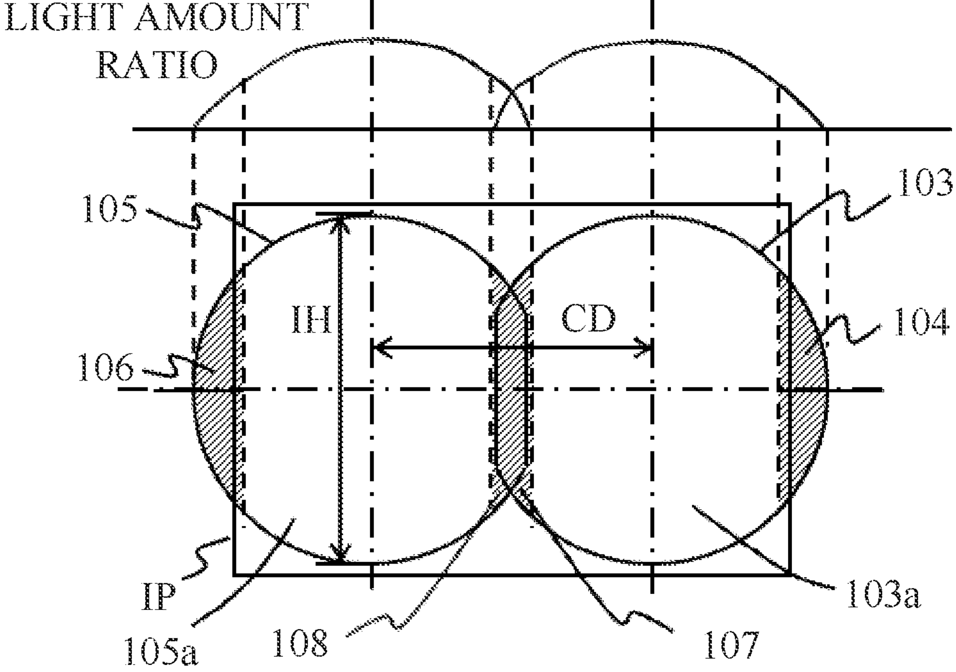
FIG. 17 illustrates an image circle on an image sensor, as a third instance.

In each example, a distance Dout between the optical axes at image-side portions of the two optical systems 101 and 102 and the image circle diameter (diameter) IH at the image side portions are set so as to satisfy the following conditions. First, as illustrated in FIG. 16 or FIG. 17, a distance CD between centers of the image circles 103 and 105 of the two optical systems 101 and 102 on the image sensor becomes shorter than the image circle diameter IH, and the third area **103*a* and 105*a* are set to be close or adjacent to each other. Second, at least part of each of the first areas 104 and 106** is set to be located outside the image sensor.

Each of the optical systems 101 and 102 includes, in order from the object side to the image side, a first lens unit (object-side lens unit or lens unit on the object side or lens unit closest to the object) L1, a second lens unit L2, and a third lens unit L3. A reflective member PR1 is disposed between the first lens unit L1 and the second lens unit L2, and a reflective member PR2 is disposed between the second lens unit L2 and the third lens unit L3. The reflective member PR1 bends the optical path of the optical system 101 in the Z direction, and the reflective member PR2 bends the optical path in the X direction. As a result, the distance Dout between the optical axes of the third lens units L3 is shorter than a distance Din between the optical axes (baseline length) of the first lens units L1 of the two optical systems 101 and 102. The baseline length is set to about a distance between the left and right eyes of a person (60 to 65 cm). Thereby, two captured images having a parallax that provides stereoscopic viewing can be obtained from the output of the single image sensor. A prism, a mirror, or the like can be used for the reflective members PR1 and PR2. SP denotes an aperture stop (diaphragm).

Although not illustrated, an optical block such as an optical filter (a low-pass filter, an infrared cut filter, etc.) or a face plate can be disposed between the third lens unit L3 and the image plane IP.

FIG. 11 illustrates rays reaching the first area 104 in the image circle 103 of the optical system 101 from the adjacent optical system 102. Since the rays reach the first area 104, the optical system 102 is reflected in the first area 104. A solid line indicates a ray from a front surface of a lens closest to the object of the optical system 102, and a broken line indicates a ray from a side surface of the lens closest to the object of the optical system 102. Similarly, since rays from the optical system 101 reach the first area 106 in the image circle 105 of the optical system 102, the optical system 101 is reflected in the first area 106.

In such a state, in a case where an image is captured through each optical system, the obtained image has an area in which the adjacent optical system is reflected and this area prevents an image to be originally viewed from being viewed.

As illustrated in FIG. 12, the first area 104 in which the left-eye optical system 102 is reflected is located near the right end in the image circle 103 of the right-eye optical system 101, whereas the right-eye optical system 101 is not reflected in the second area 108 near the right end of the image circle 105 of the left-eye optical system 102. Similarly, the first area 106 in which the right-eye optical system 101 is reflected is located near the left end in the image circle 105 of the left-eye optical system 102, whereas the left-eye optical system 102 is not reflected in the second area 107 near the left end of the image circle 103 of the right-eye optical system 101.

Thus, images near the right end and the left end for the right-eye image obtained by imaging through the right-eye optical system 101 and images near the right end and the left end for the left-eye image obtained by imaging through the left-eye optical system 102 are different from each other. Such different image areas are not suitable for viewing with both eyes. Therefore, in the image circle of each optical system, the first areas 104 and 106 in which the adjacent optical system is reflected and the second areas 107 and 108 unsuitable for image viewing are areas for which imaging is originally unnecessary.

In the stereoscopic optical system according to each example, the first and second areas (collectively referred to as unnecessary image-circle areas hereinafter) for which imaging is unnecessary in the image circle of each optical system are removed from an imaging target, and the third areas suitable for viewing (referred to as viewing image-circle areas hereinafter) are extended on the image sensor. This configuration can increase the number of pixels in image areas corresponding to the viewing image-circle areas (referred to as viewing image areas hereinafter) in the captured image, and can improve the image quality.

Figure 14:
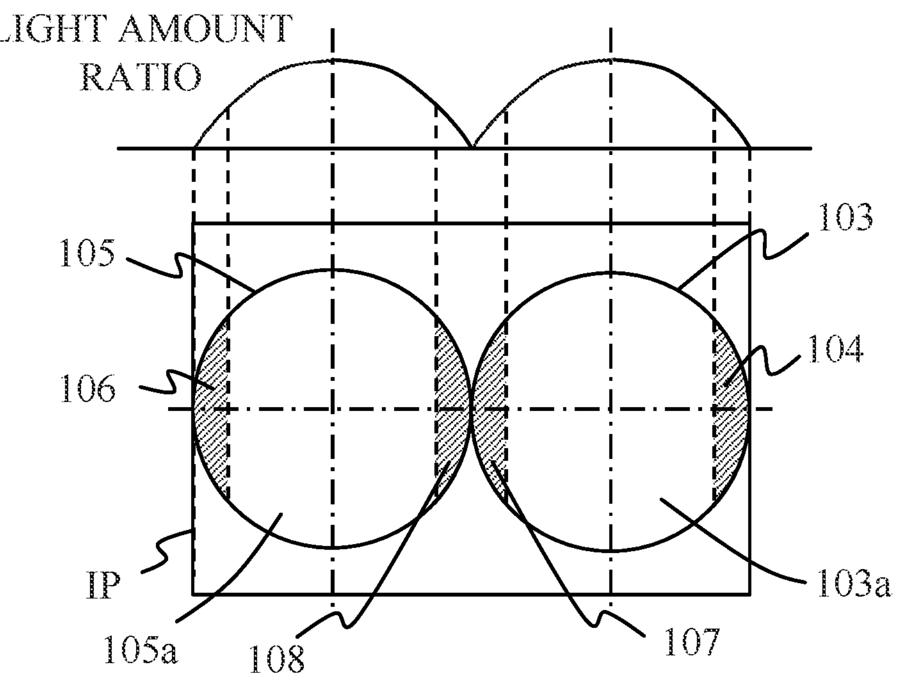
FIG. 14 illustrates an image circle on an image sensor, as a comparative instance.

FIG. 14 illustrates the image circles 103 and 105 in a case where the unnecessary image-circle areas are not deleted. The upper part of FIG. 14 illustrates a light amount distribution of the image circles 103 and 105. The unnecessary image-circle areas 104, 106, 107, and 108 on the image sensor narrow the area of the viewing image-circle areas **103*a* and 105*a***. As a result, the number of pixels in the viewing image areas in the captured image decreases, and the image quality deteriorates.

Figure 15:
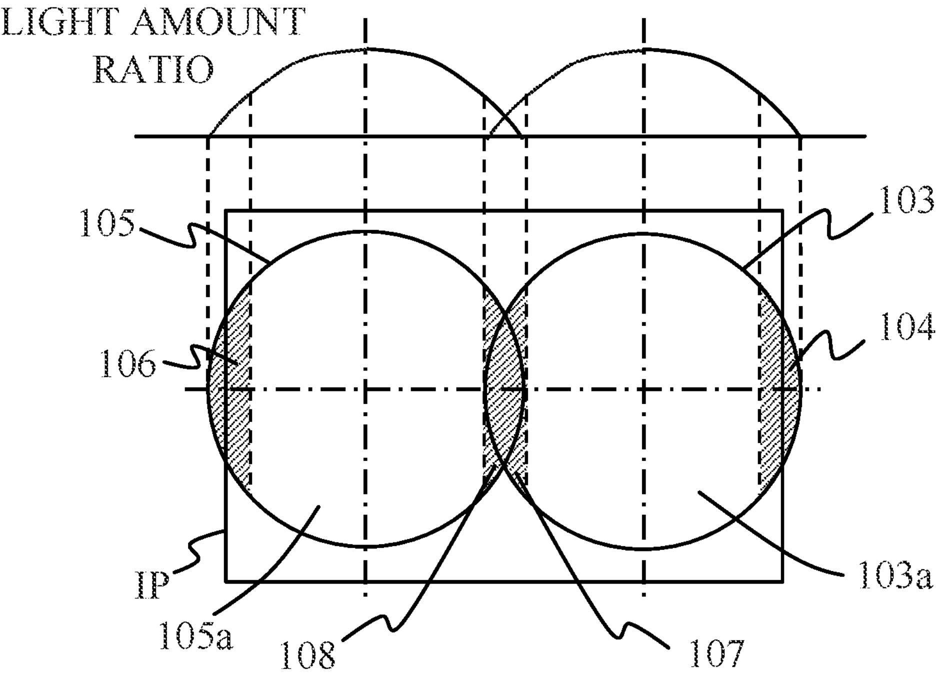
FIG. 15 illustrates an image circle on an image sensor, as a first instance.

On the other hand, FIG. 15 illustrates that the arrangement (or a distance between the optical axes of the optical systems 101 and 102) and sizes (diameters) of the image circles 103 and 105 are set such that the second areas 107 and 108 overlap each other and the first areas 104 and 106 are partially located outside the image sensor. The upper part of FIG. 15 illustrates a light amount distribution of the image circles 103 and 105. In this case, the area of the viewing image-circle areas 103_a_ and 105_a_ and the number of pixels in the viewing image areas in the captured image increase, and the image quality can be improved.

Each example sets the arrangement and sizes of the image circles 103 and 105 as illustrated in FIG. 15, and provides field stops RC between the optical systems 101 and 102 and the image sensor so as to remove the areas 107 and 108 from the image circles 103 and 105 on the image sensor. FIG. 13A illustrates effective rays passing through the optical system and reaching the image plane in a case where no field stop is provided. Rays indicated by solid lines in FIG. 13A are rays reaching the image height at the end of the viewing image-circle area. The second area is an area from this image height to an image height which the unnecessary rays indicated by the broken line reach.

FIG. 13B illustrates effective rays passing through the optical system and reaching the image plane in a case where the field stop RC is provided. The light amount in the second area is reduced by shielding the unnecessary rays illustrated in FIG. 13A using the field stop RC. The following description will also refer to reducing the light amount in the second area by the field stop RC as cutting the second area in the image circle.

FIG. 16 illustrates image circles 103 and 105 having the arrangement and sizes illustrated in FIG. 15 and the second areas 107 and 108 cut by the field stops RC. The upper part of FIG. 16 illustrates a light amount distribution of the image circles 103 and 105. D-cut ends of image circles 103 and 105 in which parts of the second areas 107 and 108 are D-cut are adjacent to each other. This configuration can reduce (eliminate) areas where the image circles 103 and 105 overlap each other.

As illustrated in FIG. 17, the image circles 103 and 105 may be enlarged to the extent that each image circle does not overlap the other viewing image-circle areas 103_a_ or 105_a_. In this case, the D-cut ends of the image circles 103 and 105 are close to each other while each D-cut end overlaps the second area of the other image circle. As a result, the inner ends of the viewing image-circle areas 103_a_ and 105_a_ are close (or may be adjacent) to each other.

By setting the arrangement and sizes of the image circles 103 and 105 in this manner, the area of the viewing image areas in the captured image can be increased, and the image quality of the viewing image areas can be further improved.

The stereoscopic optical system according to each example is an optical system that allows two optical images formed by the two optical systems 101 and 103 to be captured by one image sensor. The viewing image-circle areas 103_a_ and 105_a_ of the two optical systems 101 and 103 are made as close as possible and the size of each image circle is increased. Thus, the field stops RC are provided to prevent the image quality of an image obtained by imaging through each optical system from deteriorating due to rays from the other optical system entering the image circle of each optical system.

In addition, the angle of view of each optical system is so large that there are many imaging scenes in which stray light from a light source such as the sun is likely to enter each optical system. The optical path of such stray light is often different from the optical path of effective rays. Therefore, even if the stray light is restricted by the field stop disposed in the optical system, the effect of reducing the stray light is small. Accordingly, each example effectively shields stray light by providing the field stops RC at positions just before the image sensor (between the optical systems and the image sensor).

The rays with different image heights at least partially overlap each other at a lens behind the aperture stop SP. For example, the rays illustrated by the solid line and the rays illustrated by the broken line in FIG. 11 partially overlap each other at lenses behind the aperture stop SP and are perfectly separated on the image side of the lens closest to the image plane in each optical system. Therefore, in order to reduce a light amount drop in the viewing image-circle area as small as possible in a case where the light amounts in the second areas are reduced by the field stops RC, the field stops RC may be placed at positions between and the image sensor and the optical systems, where the rays are separated.

The stereoscopic optical system according to each example may satisfy the following inequality (1):

$$0.75 \leq Dout/IH \leq 0.99 \tag{1}$$

where Dout is the distance between the optical axes of the two optical systems 101 and 102 (that is, the third lens unit L3) at the image-side portions (that is, the third lens units L3), and IH is the image circle diameter of each optical system.

In a case where Dout/IH becomes lower than the lower limit of inequality (1), the light amount in each viewing image-circle area becomes too low. Correcting the decreased light amount by image processing would increase noise and deteriorate the image quality. In a case where Dout/IH becomes higher than the upper limit of inequality (1), each viewing image-circle area cannot be sufficiently enlarged on the image sensor, and a high-quality image cannot be obtained.

Inequality (1) may be replaced with the following inequality (1a):

$$0.77 \leq Dout/IH \leq 0.97 \tag{1a}$$

Inequality (1) may be replaced with the following inequality (1b):

$$0.79 \leq Dout/IH \leq 0.94 \tag{1b}$$

By satisfying inequality (1), the two optical systems 101 and 103 disposed in parallel maximize the size of the viewing image-circle area formed on one image sensor, and the image is obtained by imaging, and image quality can be improved.

The stereoscopic optical system according to each example may satisfy at least one of the following inequalities (2) to (6).

The following inequality (2) may be satisfied:

$$160.0° \leq 2\omega \leq 220.0° \tag{2}$$

where ω is a half angle of view of each optical system.

In a case where 2ω becomes lower than the lower limit of inequality (2), the angle of view that can be displayed by the image display apparatus becomes small, and it is not possible to provide realistic image viewing. In a case where 2ω becomes higher than the upper limit of inequality (2), the displayable angle of view is too wide, the number of pixels per unit angle of view decreases, and the image quality deteriorates.

Inequality (2) may be replaced with the following inequality (2a):

$$170.0° \leq 2\omega \leq 215.0° \tag{2a}$$

Inequality (2) may be replaced with the following inequality (2b):

$$175.0° \leq 2\omega \leq 210.0° \tag{2b}$$

The stereoscopic optical system according to each example may satisfy the following inequality (3):

$$0.05 \leq Dout/Din \leq 0.50 \tag{3}$$

where Din is the distance between the optical axes of the first lens units L1 as the object-side lens units of the two optical systems 101 and 103, and Dout is the distance between the optical axes of the third lens unit L3 as the image-side lens units (lens units on the image side or lens units closest to the image plane) of the two optical systems 101 and 103.

In a case where Dout/Din becomes lower than the lower limit of inequality (3), the baseline length becomes much wider than the human eye width, and a parallax between the left eye image and the right eye image becomes too large, and the viewer feels tired. In a case where Dout/Din is higher than the upper limit value of inequality (3), a sufficient parallax cannot be provided between the left-eye image and the right-eye image, and a stereoscopic effect cannot be provided to the viewer.

Inequality (3) may be replaced with the following inequality (3a):

$$0.1 \leq Dout/Din \leq 0.45 \tag{3a}$$

Inequality (3) may be replaced with the following inequality (3b):

$$0.15 \leq Dout/Din \leq 0.40 \tag{3b}$$

The stereoscopic optical system according to each example may satisfy the following inequality (4):

$$2.40 \leq Fno \leq 6.50 \tag{4}$$

where Fno is an F-number of each optical system.

In a case where Fno is lower than the lower limit of inequality (4), the reflective members PR1 and PR2 and the aperture stop SP become large. In a case where Fno is higher than the upper limit of inequality (4), noise increases during imaging and image quality deteriorates.

Inequality (4) may be replaced with the following inequality (4a):

$$2.55 \leq Fno \leq 5.90 \tag{4a}$$

Inequality (4) may be replaced with the following inequality (4b):

$$2.7 \leq Fno \leq 4.50 \tag{4b}$$

Figure 4:
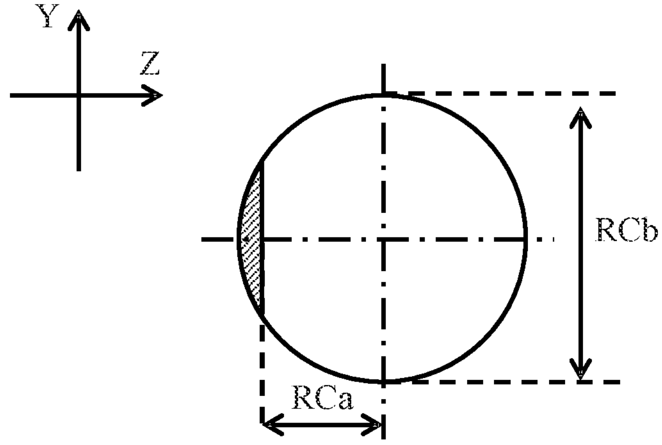
FIG. 4 explains a field stop according to Example 1.

FIG. 4 schematically illustrates the field stops RC provided to each optical system. The field stop RC shields rays in order to reduce the light amount in the second area at a light shielding portion (hatched portion) outside a position at a distance RCa from the optical axis of each optical system. RCb (>RCa) is a maximum aperture diameter of a portion where the light shielding portion is not provided in the field stop RC. At this time, RCa and RCb may satisfy the following inequality (5):

$$0.25 \leq RCa/RCb \leq 0.48 \tag{5}$$

In a case where RCa/RCb becomes lower than the lower limit of inequality (5), the light amounts in the viewing image-circle areas become too low. In a case where RCa/RCb is higher than the upper limit of inequality (5), the light amounts in the unnecessary image-circle areas cannot be sufficiently reduced, and the viewing image-circle areas cannot be enlarged, and the image quality cannot be improved.

Inequality (5) may be replaced with the following inequality (5a).

$$0.28 \leq RCa/RCb \leq 0.47 \tag{5a}$$

Inequality (5) may be replaced with the following inequality (5b).

$$0.30 \leq RCa/RCb \leq 0.46 \tag{5b}$$

The shape of the field stop RC may be a linear shape passing through the position at RCa from the optical axis as illustrated in FIG. 4, or may be a curved shape passing through the position at RCa.

The stereoscopic optical system according to each example may satisfy the following inequality (6):

$$0.20 \leq dRC/sk < 1.00 \tag{6}$$

where dRC is a distance on the optical axis from field stop RC to image plane IP, and sk is a distance on the optical axis from a surface on the image side of a lens having refractive power and disposed closest to the image plane (final lens) in each optical system to the image plane IP.

Each example provides the field stop RC between the final lens of each optical system and the image plane IP, in order to reduce the light amount in the unnecessary image-circle area and to minimize a light amount drop in each viewing image-circle area as described above. In a case where dRC/sk becomes lower than the lower limit of inequality (6), the light amount in the area suitable for viewing is greatly reduced. In a case where dRC/sk becomes higher than the upper limit of inequality (6), interference with an optical element such as a low-pass filter and an infrared cut filter disposed on the object side of the image sensor occurs.

Inequality (6) may be replaced with the following inequality (6a):

$$0.35 \leq dRC/sk \leq 0.95 \tag{6a}$$

Inequality (6) may be replaced with the following inequality (6b):

$$0.50 \leq dRC/sk \leq 0.90 \tag{6b}$$

A description will now be given of the stereoscopic optical systems according to Examples 1 to 3 together with corresponding numerical examples.

Example 1

Figure 1:
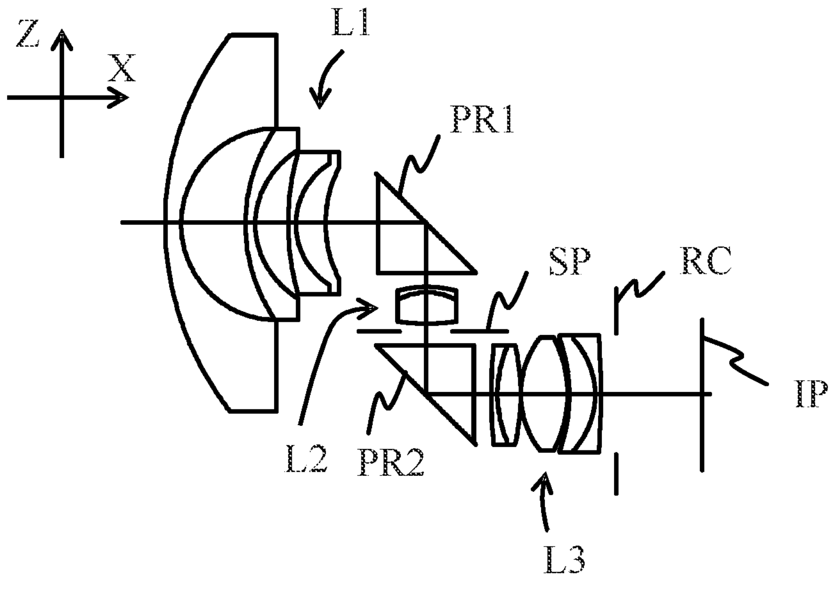
FIG. 1 is a sectional view of one of optical systems in a stereoscopic optical system according to Example 1.

The stereoscopic optical system according to Example 1 (numerical example 1) includes two optical systems with an image height of 10.00 mm, a focal length of 5.59 mm, and a half angle of view of 102.50° as illustrated in FIG. 1 and is used for an image pickup apparatus that includes an image sensor with a horizontal size of 36 mm and a vertical size of 24 mm. The optical axes of the third lens units L3 in the two optical systems are located at +9 mm and −9 mm from the center of the image sensor in the Z direction, respectively. The difference Dout between the optical axes of the third lens units L3 is 18.0 mm. The baseline length (Din) of the two optical systems is 63.6 mm.

The first lens unit L1 in each optical system includes, in order from the object side to the image side, a negative meniscus lens that is convex to the object side, a negative meniscus lens that is convex to the object side, and a cemented lens that includes a negative meniscus lens that is convex to the object side and a positive meniscus lens that is convex to the object side. An aspherical surface set to a surface on the image side of the second negative meniscus lens counted from the object side can correct curvature of field and astigmatism.

The second lens unit L2 in each optical system includes, in order from the object side to the image side, a cemented lens of a negative meniscus lens that is convex to the object side and a biconvex lens, and an aperture stop SP.

The third lens unit L3 in each optical system includes, in order from the object side to the image side, a cemented lens of a negative meniscus lens that is convex to the object side and a biconvex lens, a biconvex lens, and a cemented lens of a positive meniscus lens that is convex to the image side and a negative meniscus lens that is convex to the image side.

Figure 3:
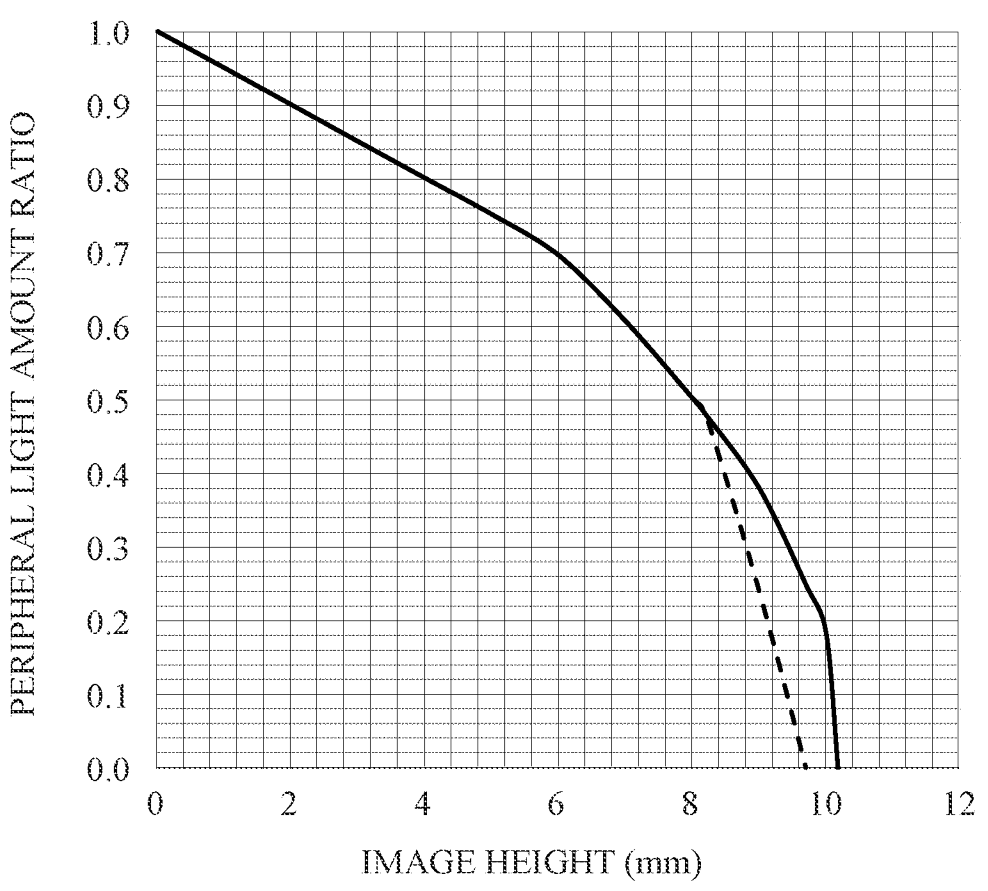
FIG. 3 illustrates a peripheral light amount ratio according to numerical example 1.

A solid line in FIG. 3 indicates a peripheral light amount ratio for each image height against an on-axis light amount in a direction (Y direction) in which the field stop RC is not provided in the optical system according to numerical example 1. A broken line in FIG. 3 indicates a peripheral light amount ratio in the Z direction that is reduced by the field stop RC in the optical system according to numerical example 1. The optical system according to numerical example 1 has an image height of 10.00 mm, but a light amount is required to some extent for image viewing and thus a light amount ratio at the image height of 10.00 mm is set to 18.7%. Hence, even an image height of 10.00 mm or more has a light amount, and an image height at which the light amount ratio is 0% is 10.18 mm.

In this way, the image height is restricted by the field stop RC so that an area having a light amount exceeding the set image height of 10.00 mm does not overlap a viewing area of an image generated by imaging through the adjacent optical system.

In this numerical example, the highest image height in the Z direction of the viewing image-circle area is 8.20 mm (10.18 mm in the Y direction), and as indicated by a broken line, the field stop RC is provided such that a light amount decreases from the image height of 8.20 mm in the Z direction. More specifically, in FIG. 4, the field stop RC is provided so as to attenuate light in an area at RCa of 6.60 mm or more in the Z direction in the original effective diameter RCb of 15.45 mm, and thereby the light amount ratio is lowered from an image height of 8.20 mm to 0% at an image height of 9.70 mm, as illustrated by the broken line in FIG. 3.

As described above, the distance between the optical axes of the third lens units L3 in the two optical systems is 18.0 mm, the viewing image-circle area has an image height up to 8.20 mm, and the image height that provides a peripheral light amount ratio of 0% is 9.70 mm. Hence, the viewing image-circle area of each of the two optical systems does not overlap the viewing image-circle area of the adjacent optical system.

While the distance from the center of the image sensor to the edge in the Z direction is 9.0 mm, the first area where the adjacent optical system is reflected is an area having an image height from 8.20 mm, and the viewing image-circle area is located within the image sensor. Thus, it is important to set the distance between the optical axes of the third lens units L3, the image circle diameter, and the field stop RC such that the viewing image-circle areas of the two optical systems are secured on the central side of the image sensor, and first areas where the adjacent optical system is reflected are located outside the image sensor on the peripheral side of the image sensor.

Figure 2:
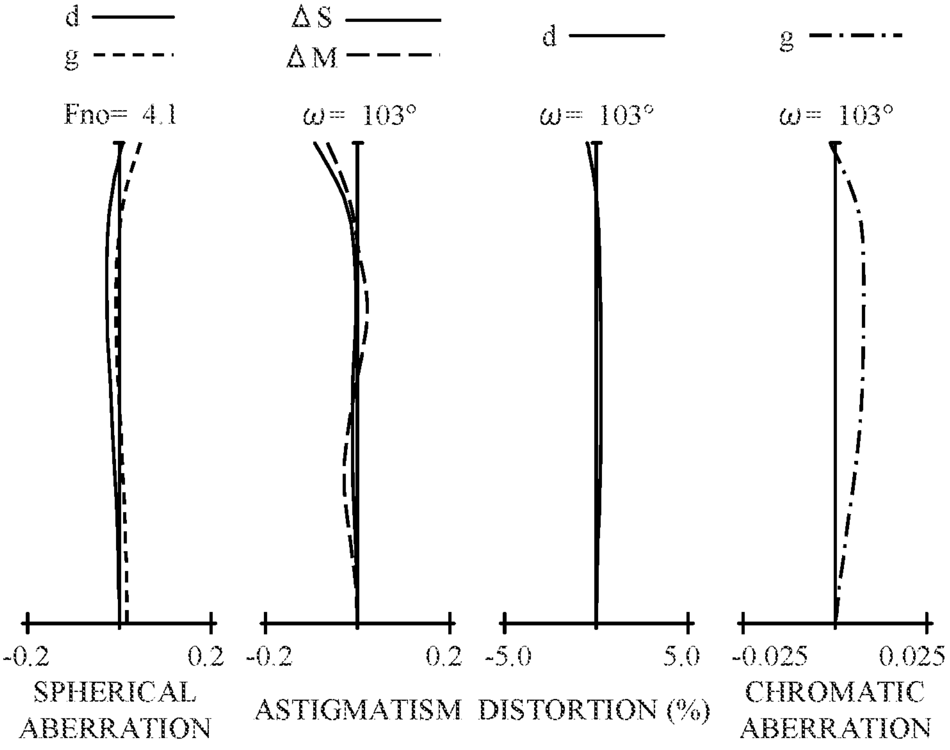
FIG. 2 is a longitudinal aberration diagram according to Example 1 (numerical example 1).

FIG. 2 illustrates longitudinal aberrations (spherical aberration, astigmatism, distortion, and chromatic aberration) of the optical system according to numerical example 1. In the spherical aberration diagrams, Fno denotes an F-number. A solid line indicates a spherical aberration amount for the d-line (wavelength 587.6 nm), and a dashed line indicates a spherical aberration amount for the g-line (wavelength 435.8 nm). In the astigmatism diagrams, a solid line ΔS indicates an astigmatism amount on a sagittal image plane, and a dashed line ΔM indicates an astigmatism amount on a meridional image plane. The distortion diagram illustrates a distortion amount for the d-line. The chromatic aberration diagram illustrates a lateral chromatic aberration amount for the g-line. ω is a half angle of view (°). The explanation of these longitudinal aberration diagrams is similarly applied to that of another numerical example to be described below.

After Example 3, numerical values of numerical example 1 will be illustrated. In surface data of each numerical example, a surface number i is the order of a surface counted from the object side. r denotes a radius of curvature of the i-th surface counted from the object side. d (mm) denotes a lens thickness or air gap (mm) between the i-th surface and an (i+1)-th surface. nd denotes a refractive index for the d-line of each optical element between the i-th surface and the (i+1)-th surface. νd denotes an Abbe number based on the d-line of the optical element between the i-th surface and the (i+1)-th surface. The Abbe number is expressed as follows:

$$\nu d=(Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

BF denotes a back focus (mm). The back focus is a distance on the optical axis from the final lens surface (lens surface closest to the image plane) to a paraxial image plane in terms of an air equivalent length, and corresponds to sk in inequality (6). An overall lens length is a length obtained by adding the back focus to a distance on the optical axis from the frontmost surface (lens surface closest to the object) to the final surface of the optical system.

An asterisk * attached to a surface number means that the surface has an aspherical shape. The aspherical shape is expressed as follows:

$$X=\frac{H^2/R}{1+\sqrt{1-(1+K)(H/R)^2}}+A4H^4+A6H^6+A8H^8+A10H^{10}$$

where X is a displacement amount from a surface vertex in the optical axis direction, H is a height from the optical axis in a direction orthogonal to the optical axis, a light traveling direction is set positive, R is a paraxial radius of curvature, K is a conical constant, A4, A6, A8, and A10 are aspherical coefficients. "e-M" in each of the conical constant and aspherical coefficient means "×10-M."

Table 1 summarizes values corresponding to inequalities (1) to (6) in numerical example 1.

Example 2

Figure 5:
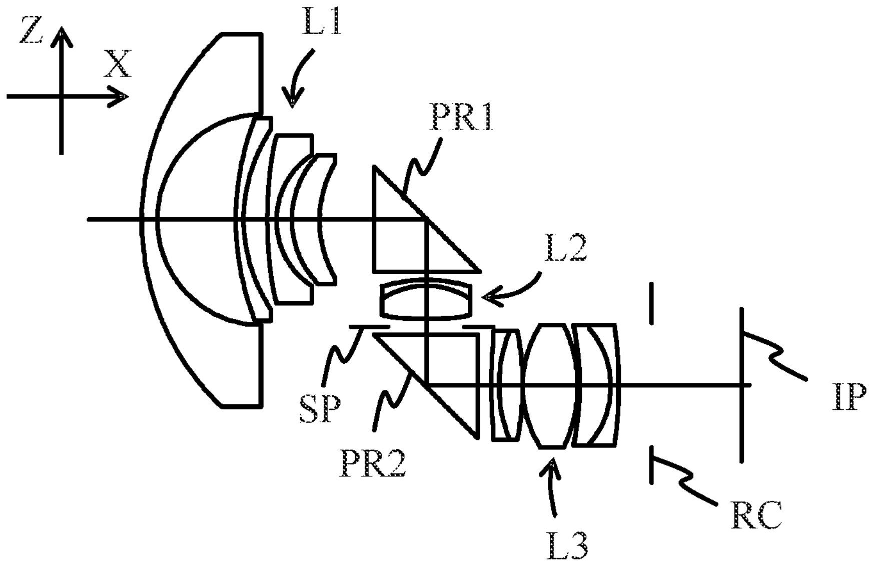
FIG. 5 is a sectional view of one of optical systems in a stereoscopic optical system according to Example 2.

A stereoscopic optical system according to Example 2 (numerical example 2) includes two optical systems with an image height of 9.70 mm, a focal length of 5.74 mm, and a half angle of view of 96.82° illustrated in FIG. 5, and is used for an image pickup apparatus with an image sensor having a horizontal size of 36 mm and a vertical size of 24 mm. The optical axes of the third lens unit L3 of the two optical systems are located at +9.25 mm and −9.25 mm from the center of the image sensor in the Z direction, respectively. The distance Dout between the optical axes of the third lens units L3 is 18.5 mm. The baseline length (Din) of the two optical systems is 60.75 mm.

The first lens unit L1 in each optical system includes, in order from the object side to the image side, a negative meniscus lens that is convex to the object side, a negative meniscus lens that is convex to the object, a negative meniscus lens that is convex to the object side, and a positive meniscus lens that is convex to the object side. An aspherical surface set to a surface on the object side of the third negative meniscus lens counted from the object side can correct curvature of field and astigmatism. The second and third lens units L2 and L3 in each optical system have the same configurations as those of Example 1.

Figure 7:
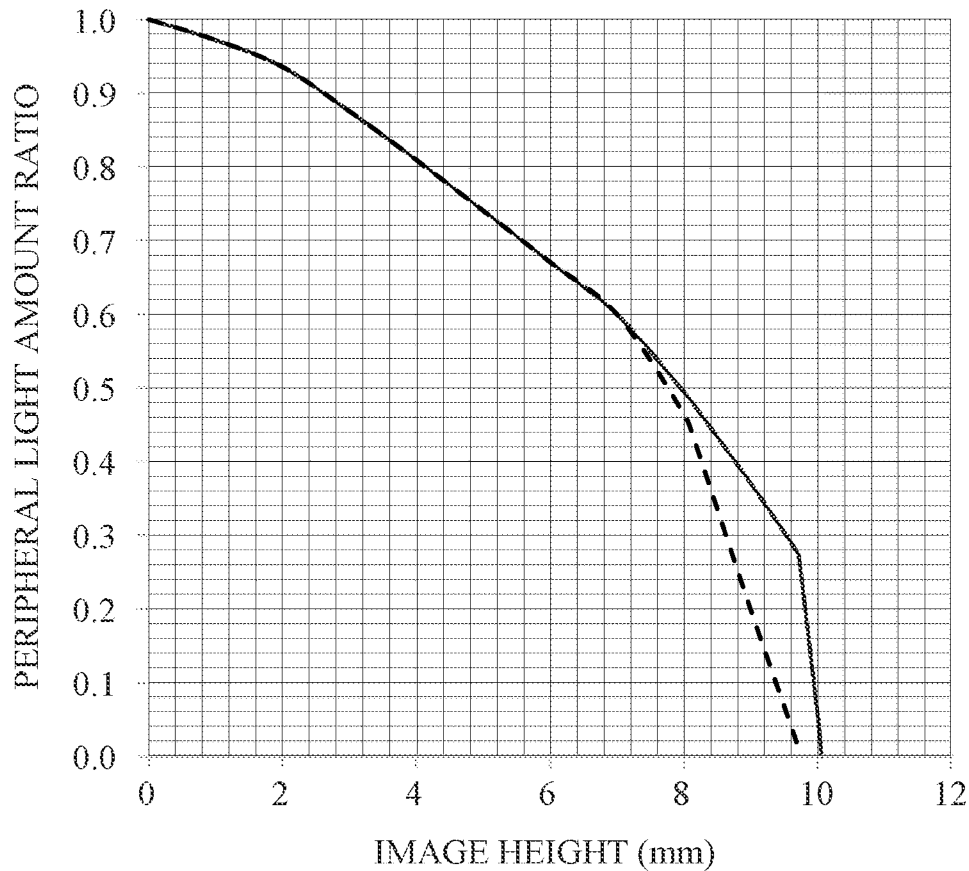
FIG. 7 illustrates a peripheral light amount ratio according to numerical example 2.

A solid line in FIG. 7 indicates a peripheral light amount ratio for each image height against an on-axis light amount in the Y direction in which the field stop RC is not provided in the optical system according to numerical example 2. A broken line in FIG. 7 indicates a peripheral light amount ratio in the Z direction that is reduced by the field stop RC in the optical system according to numerical example 2. The second area in this numerical example is an area with an image height of 8.18 mm or more, and the field stop RC is set so that the light amount is reduced from an image height of 7.59 mm in the Z direction. This setting reduces the light amount in the viewing image-circle area, but the image height at which the light amount is 0 is reduced. It is thus possible to widen a distance between the viewing image-circle areas of the two optical systems, and to further enlarge the image circle. That is, this example can achieve higher image quality of the captured image.

A light amount in the viewing image-circle area may be lowered by the field stop RC within a range that does not hinder viewing of the captured image.

This numerical example provides the field stop RC so as to attenuate light in an area at RCa of 6.60 mm or more in the Z direction in the effective diameter RCb of 15.83 mm as illustrated in FIG. 4, and thereby the light amount ratio is lowered from an image height of 59 mm to 0% at an image height of 9.72 mm, as illustrated by a broken line in FIG. 7.

As described above, the distance between the optical axes of the third lens units L3 in the two optical systems is 18.5 mm, the viewing image-circle area has an image height up to 8.18 mm, and the image height that provides a peripheral light amount ratio of 0% is 9.72 mm. Hence, the viewing image-circle area of each of the two optical systems does not to overlap the viewing image-circle area of the adjacent optical system.

While the distance from the center of the image sensor to the edge in the Z direction is 8.75 mm, the first area where the adjacent optical system is reflected is an area having an image height from 8.18 mm, and the viewing image-circle area is located within the image sensor.

Figure 6:
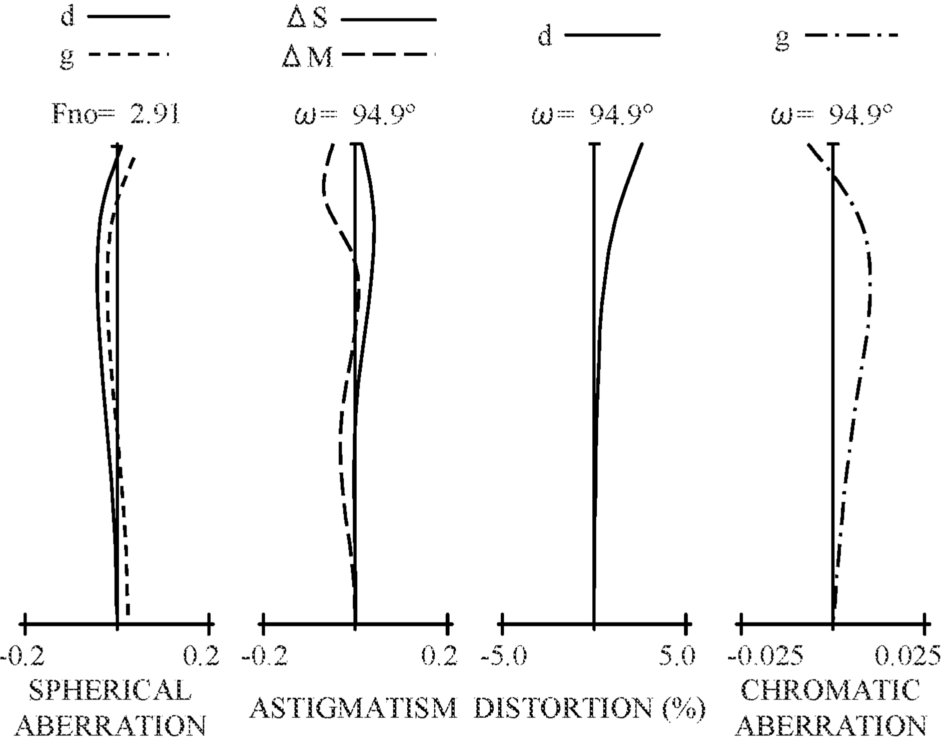
FIG. 6 is a longitudinal aberration diagram according to Example 2 (numerical example 2).

FIG. 6 illustrates longitudinal aberrations of the optical system according to numerical example 2. Table 1 summarizes values corresponding to inequalities (1) to (6) in numerical example 2.

Example 3

Figure 8:
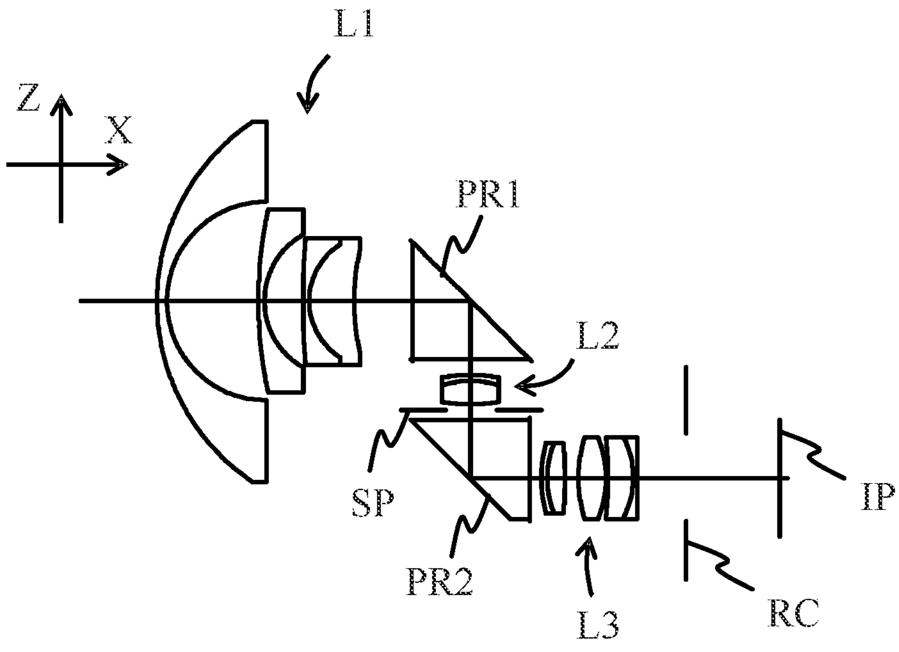
FIG. 8 is a sectional view of one of optical systems in a stereoscopic optical system according to Example 3.

A stereoscopic optical system according to Example 3 (numerical example 3) includes two optical systems with an image height of 7.00 mm, a focal length of 3.85 mm, and a half angle of view of 104.18° illustrated in FIG. 8, and is used for an image pickup apparatus with an image sensor having a horizontal size of 22.5 mm and a vertical size of 15 mm. The optical axes of the third lens unit L3 of the two optical systems are located at +5.70 mm and −5.70 mm from the center of the image sensor in the Z direction, respectively. The distance Dout between the optical axes of the third lens units L3 is 11.4 mm. The baseline length (Din) of the two optical systems is 55.0 mm.

The first, second, and third lens units L1, L2, and L3 in each optical system have the same configurations as those of Example 1.

Figure 10:
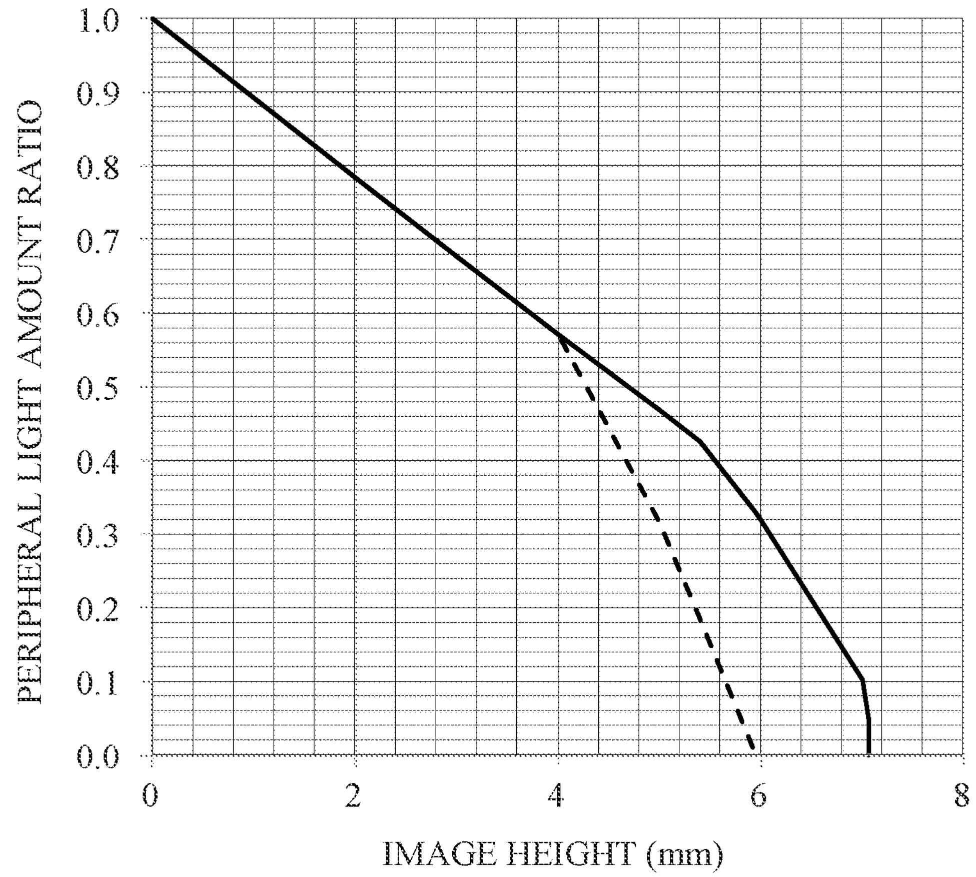
FIG. 10 illustrates a peripheral light amount ratio according to numerical example 3.

A solid line in FIG. 10 indicates a peripheral light amount ratio for each image height against an on-axis light amount in the Y direction in which the field stop RC is not provided in the optical system according to numerical example 3, and the image height where the light amount ratio is 0% is 7.06 mm. A broken line in FIG. 10 indicates a peripheral light amount ratio in the Z direction that is reduced by the field stop RC in the optical system according to numerical example 3. The second area in this numerical example is an area with an image height of 5.40 mm or more, and the field stop RC is set so that the light amount is reduced from an image height of 4.00 mm in the Z direction.

In this example, a light amount in the viewing image-circle area may be lowered by the field stop RC within a range that does not hinder viewing of the captured image, but the light amount drop may be compensated for by performing image processing for the captured image.

This numerical example provides the field stop RC so as to attenuate light in an area at RCa of 3.71 mm or more in the Z direction in an effective diameter RCb of 10.86 mm as illustrated in FIG. 4, and thereby the light amount ratio is lowered from an image height of 4.00 mm to 0% at an image height of 5.95 mm, as illustrated by a broken line in FIG. 10.

As described above, the distance between the optical axes of the third lens units L3 in the two optical systems is 11.4 mm, the viewing image-circle area has an image height up to 5.40 mm, and the image height that provides a peripheral light amount ratio of 0% is 5.95 mm. Hence, the viewing image-circle area of each of the two optical systems does not overlap the viewing image-circle area of the adjacent optical system.

While the distance from the center of the image sensor to the edge in the Z direction is 5.55 mm, the first area where the adjacent optical system is reflected is an area having an image height from 5.40 mm, and the viewing image-circle area is located within the image sensor.

Figure 9:
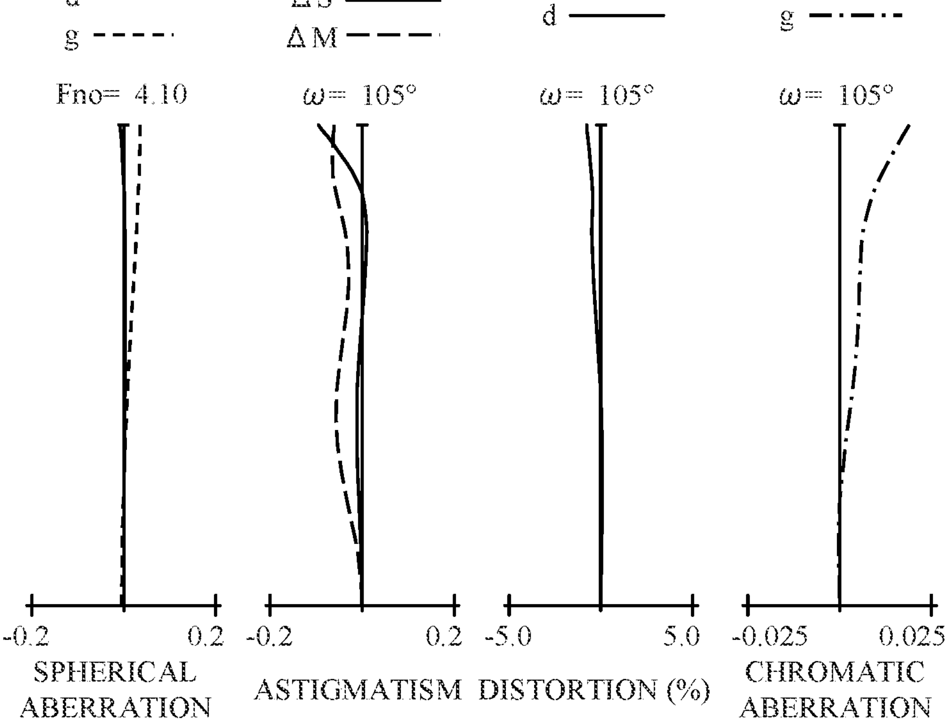
FIG. 9 is a longitudinal aberration diagram according to Example 3 (numerical example 3).

FIG. 9 illustrates longitudinal aberrations of the optical system according to numerical example 3. Table 1 summarizes values corresponding to inequalities (1) to (6) in numerical example 3.

Each of the above examples can maximize the image circles formed on a single image sensor by the two optical systems that are arranged in parallel, and can improve the quality of the image obtained by imaging.

In each of the above examples, the projection method of the optical system is the equiangular projection method. However, an optical system of another projection method such as an equisolid angle projection method or a stereographic projection method may be used.

The sizes of the image sensors given in the above examples are merely illustrative, and an image sensors of another size may be used.

[NUMERICAL EXAMPLE 1]
UNIT: mm
Surface Data

| Surface No. | r | d | nd | vd | Effective Diameter |
|---|---|---|---|---|---|
| 1 | 40.212 | 2.00 | 1.91082 | 35.3 | 48.01 |
| 2 | 12.305 | 9.23 | | | 24.54 |
| 3 | 23.956 | 1.09 | 1.85400 | 40.4 | 22.96 |
| 4* | 12.069 | 3.85 | | | 19.19 |
| 5 | 32.411 | 1.09 | 1.90043 | 37.4 | 18.31 |
| 6 | 9.048 | 4.18 | 1.85478 | 24.8 | 15.10 |
| 7 | 14.719 | 7.49 | | | 13.66 |
| 8 | ∞ | 13.00 | 1.51633 | 64.1 | 10.15 |
| 9 | ∞ | 2.00 | | | 6.56 |
| 10 | 14.807 | 0.80 | 2.00100 | 29.1 | 7.15 |
| 11 | 9.141 | 4.00 | 1.62004 | 36.3 | 7.01 |
| 12 | −32.731 | 1.00 | | | 7.11 |
| 13(Aperture Stop) | ∞ | 2.00 | | | 7.01 |
| 14 | ∞ | 13.00 | 1.51633 | 64.1 | 6.85 |
| 15 | ∞ | 1.97 | | | 9.52 |
| 16 | 50.909 | 0.97 | 2.00100 | 29.1 | 11.20 |
| 17 | 19.691 | 3.01 | 1.49700 | 81.5 | 11.56 |
| 18 | −30.051 | 0.00 | | | 12.38 |
| 19 | 12.552 | 6.53 | 1.43875 | 94.7 | 14.12 |
| 20 | −16.148 | 0.30 | | | 13.99 |
| 21 | −17.940 | 3.21 | 1.59522 | 67.7 | 13.70 |
| 22 | −11.478 | 0.86 | 2.00100 | 29.1 | 13.69 |
| 23 | −80.041 | 2.05 | | | 14.50 |
| 24 | ∞ | 11.46 | | | 15.45 |
| Image Plane | ∞ | | | | |

Aspheric Data
4th Surface

K = −9.46957e−002 A4 = −2.00280e−005 A6 = 1.39815e−007 A8 = −2.65465e−009

Various data

| | |
|---|---|
| Focal Length | 5.59 |
| FNO | 4.10 |
| Half Angle of View (degree) | 102.50 |
| Image Height | 10.00 |
| Overall lens length | 95.08 |

-continued

| | |
|---|---|
| BF | 11.46 |
| Entrance Pupil Position | 12.15 |
| Exit Pupil Position | −24.35 |
| Front Principal-Point Position | 16.86 |
| Rear Principal-Point Position | 5.87 |
| Rca | 6.60 |
| Rcb | 15.45 |

Single Lens Data

| Lens | Starting Surface | Focal Length |
|---|---|---|
| 1 | 1 | −20.15 |
| 2 | 3 | −29.73 |
| 3 | 5 | −14.25 |
| 4 | 6 | 20.51 |
| 5 | 8 | 0.00 |
| 6 | 10 | −25.68 |
| 7 | 11 | 11.96 |
| 8 | 14 | 0.00 |
| 9 | 16 | −32.59 |
| 10 | 17 | 24.43 |
| 11 | 19 | 17.30 |
| 12 | 21 | 45.17 |
| 13 | 22 | −13.47 |

[NUMERICAL EXAMPLE 2]
UNIT: mm
Surface Data

| Surface No. | r | d | nd | vd | Effective Diameter |
|---|---|---|---|---|---|
| 1 | 32.477 | 1.94 | 1.95375 | 32.3 | 45.69 |
| 2 | 13.390 | 10.10 | | | 26.47 |
| 3 | 36.545 | 1.05 | 1.83481 | 42.7 | 24.20 |
| 4 | 20.546 | 3.00 | | | 21.22 |
| 5* | 61.673 | 1.05 | 1.85400 | 40.4 | 19.54 |
| 6 | 9.845 | 2.09 | | | 15.42 |
| 7 | 11.893 | 3.50 | 1.85478 | 24.8 | 15.29 |
| 8 | 14.071 | 6.90 | | | 13.43 |
| 9 | ∞ | 13.25 | 1.51633 | 64.1 | 10.71 |
| 10 | ∞ | 1.00 | | | 9.22 |
| 11 | 18.144 | 0.75 | 1.91082 | 35.3 | 9.78 |
| 12 | 10.520 | 4.25 | 1.59270 | 35.3 | 9.65 |
| 13 | −33.345 | 1.00 | | | 9.89 |
| 14(Aperture Stop) | ∞ | 1.00 | | | 9.84 |
| 15 | ∞ | 13.00 | 1.51633 | 64.1 | 9.80 |
| 16 | ∞ | 1.72 | | | 10.39 |
| 17 | 44.257 | 0.94 | 1.95375 | 32.3 | 11.88 |
| 18 | 18.233 | 3.15 | 1.49700 | 81.5 | 12.20 |
| 19 | −35.627 | 0.00 | | | 12.97 |
| 20 | 14.043 | 6.91 | 1.43875 | 94.7 | 14.50 |
| 21 | −17.502 | 0.30 | | | 14.46 |
| 22 | −37.189 | 4.08 | 1.49700 | 81.5 | 13.93 |
| 23 | −10.631 | 0.83 | 2.00100 | 29.1 | 13.56 |
| 24 | −54.546 | 4.27 | | | 14.36 |
| 25 | ∞ | 11.46 | | | 15.83 |
| Image Plane | ∞ | | | | |

Aspheric Data
5th Surface

K = 0.00000e+000 A4 = 9.42786e−006 A6 = −1.81797e−007 A8 = 2.60380e−009
A10 = −9.79910e−012

Various data

| | |
|---|---|
| Focal Length | 5.74 |
| FNO | 2.91 |
| Half Angle of View (degree) | 96.82 |
| Image Height | 9.70 |
| Overall lens length | 97.55 |
| BF | 11.46 |
| Entrance Pupil Position | 13.53 |
| Exit Pupil Position | −28.20 |

-continued

| | |
|---|---|
| Front Principal-Point Position | 18.44 |
| Rear Principal-Point Position | 5.72 |
| Rca | 6.60 |
| Rcb | 15.83 |

Single Lens Data

| Lens | Starting Surface | Focal Length |
|---|---|---|
| 1 | 1 | −25.14 |
| 2 | 3 | −57.96 |
| 3 | 5 | −13.85 |
| 4 | 7 | 51.64 |
| 5 | 9 | 0.00 |
| 6 | 11 | −28.84 |
| 7 | 12 | 14.00 |
| 8 | 15 | 0.00 |
| 9 | 17 | −33.10 |
| 10 | 18 | 24.75 |
| 11 | 20 | 19.03 |
| 12 | 22 | 28.50 |
| 13 | 23 | −13.32 |

[NUMERICAL EXAMPLE 3]
UNIT: mm
Surface Data

| Surface No. | r | d | nd | vd | Effective Diameter |
|---|---|---|---|---|---|
| 1 | 26.681 | 1.40 | 2.00100 | 29.1 | 42.54 |
| 2 | 12.236 | 11.23 | | | 24.42 |
| 3 | 54.814 | 0.76 | 1.85400 | 40.4 | 20.83 |
| 4* | 9.538 | 4.71 | | | 15.28 |
| 5 | 91.244 | 0.76 | 1.88300 | 40.8 | 14.48 |
| 6 | 8.241 | 5.63 | 1.85478 | 24.8 | 12.87 |
| 7 | 36.217 | 7.12 | | | 11.59 |
| 8 | ∞ | 14.41 | 1.51633 | 64.1 | 8.15 |
| 9 | ∞ | 1.90 | | | 5.60 |
| 10 | 28.260 | 0.78 | 1.91082 | 35.3 | 5.99 |
| 11 | 11.944 | 2.80 | 1.59270 | 35.3 | 5.98 |
| 12 | −26.153 | 0.70 | | | 6.20 |
| 13(Aperture Stop) | ∞ | 1.21 | | | 6.22 |
| 14 | ∞ | 14.41 | 1.95375 | 32.3 | 6.24 |
| 15 | ∞ | 1.51 | | | 6.37 |
| 16 | 16.501 | 0.68 | 1.90043 | 37.4 | 7.29 |
| 17 | 12.163 | 2.20 | 1.43875 | 94.7 | 7.35 |
| 18 | −58.748 | 1.76 | | | 7.80 |
| 19 | 21.262 | 3.26 | 1.43875 | 94.7 | 8.68 |
| 20 | −14.448 | 0.30 | | | 8.95 |
| 21 | −50.926 | 3.13 | 1.49700 | 81.5 | 8.87 |
| 22 | −10.135 | 0.60 | 1.95375 | 32.3 | 8.85 |
| 23 | −59.880 | 6.03 | | | 9.16 |
| 24 | ∞ | 11.46 | | | 10.86 |
| Image Plane | ∞ | | | | |

Aspheric Data
4th Surface

K = 7.88130e−002 A4 = −3.19820e−005 A6 = 6.69832e−007 A8 = −4.82627e−009

| | |
|---|---|
| Focal Length | 3.85 |
| FNO | 4.10 |
| Half Angle of View (degree) | 104.18 |
| Image Height | 7.00 |
| Overall lens length | 98.74 |
| BF | 11.46 |
| Entrance Pupil Position | 12.17 |
| Exit Pupil Position | −29.90 |
| Front Principal-Point Position | 15.66 |
| Rear Principal-Point Position | 7.61 |
| Rca | 3.71 |
| Rcb | 10.86 |

-continued

| Single Lens Data | | |
|---|---|---|
| Lens | Starting Surface | Focal Length |
| 1 | 1 | −23.73 |
| 2 | 3 | −13.63 |
| 3 | 5 | −10.30 |
| 4 | 6 | 11.42 |
| 5 | 8 | 0.00 |
| 6 | 10 | −23.24 |
| 7 | 11 | 14.22 |
| 8 | 14 | 0.00 |
| 9 | 16 | −55.50 |
| 10 | 17 | 23.19 |
| 11 | 19 | 20.17 |
| 12 | 21 | 24.83 |
| 13 | 22 | −12.87 |

TABLE 1

| | | Example 1 | Example 2 | Example 3 |
|---|---|---|---|---|
| Inequality 1 | Dout /IH | 0.88 | 0.92 | 0.81 |
| Inequality 2 | 2ω | 205.0 | 193.6 | 208.4 |
| Inequality 3 | Dout/Din | 0.28 | 0.30 | 0.21 |
| Inequality 4 | Fno | 4.10 | 2.91 | 4.10 |
| Inequality 5 | RCa/RCb | 0.43 | 0.42 | 0.34 |
| Inequality 6 | dRC/sk | 0.85 | 0.73 | 0.66 |

Figure 18:
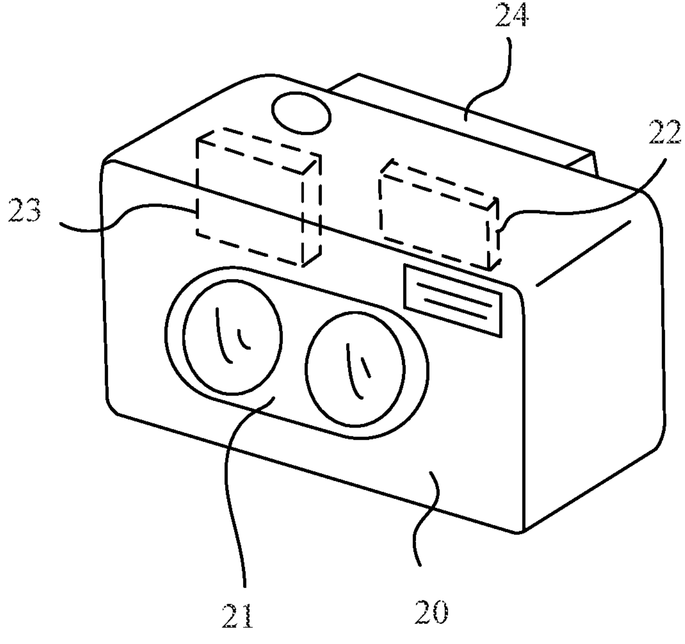
FIG. 18 is an external view of an image pickup apparatus that includes a stereoscopic optical system according to each example.

FIG. 18 illustrates a digital still camera as an image pickup apparatus using the stereoscopic optical system according to any one of the above examples as an imaging optical system. Reference numeral 20 denotes a camera body, and reference numeral 21 denotes the imaging optical system that includes the stereoscopic optical system according to any one of Examples 1 to 3. Reference numeral 22 denotes an image sensor, such as a CCD sensor and a CMOS sensor, built in the camera body 20 and configured to capture an optical image (object image) formed by the imaging optical system 21. Reference numeral 23 denotes a recording unit that records image data generated by processing the imaging signal from the image sensor 22, and reference numeral 24 denotes a rear display unit that displays the image data.

The stereoscopic optical system according to each example in this camera can provide high-quality images that allow stereoscopic viewing.

Each of the above examples can maximize image circles (third areas) formed on a single image sensor by the two optical systems that are arranged in parallel, and can improve the quality of the image obtained by imaging.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-005462, filed on Jan. 18, 2022, which is hereby incorporated by reference herein in its entirety.

What is claimed is:

1. A stereoscopic optical system comprising two optical systems arranged in parallel and configured to form image circles of the two optical systems on a single image sensor, wherein each of the two optical systems has an angle of view in which an image from one optical system is formed in a first area at an outer peripheral portion in an image circle of another optical system, wherein each of the two optical systems includes a field stop configured to reduce a light amount in a second area at an inner peripheral portion of the image circle in the parallel arrangement direction, wherein each of the field stops is disposed between the image sensor and a lens which is arranged closest of the image sensor in the optical system, and wherein a distance between centers of the image circles of the two optical systems is shorter than a diameter of each image circle on the image sensor, and at least part of each first area is located outside the image sensor.

2. The stereoscopic optical system according to claim 1, wherein the following inequality is satisfied:

$$0.75 \le Dout/IH \le 0.99$$

where Dout is the distance between centers of the image circles of the two optical systems, and IH is the diameter of each image circle.

3. The stereoscopic optical system according to claim 1, wherein the following inequality is satisfied:

$$160.0° \le 2\omega \le 220.0°$$

where ω is a half angle of view of each of the two optical systems.

4. The stereoscopic optical system according to claim 1, wherein each of the two optical systems includes an object-side lens unit and an image-side lens unit, wherein due to an optical path bent between the object-side lens unit and the image-side lens unit, a distance between optical axes of image-side lens units becomes shorter than a distance between optical axes of object-side lens units in the two optical systems, and wherein the distance between the optical axes of the two optical systems is the distance between the optical axes of the image-side lens units.

5. The stereoscopic optical system according to claim 4, wherein the following inequality is satisfied:

$$0.05 \le Dout/Din \le 0.50$$

where Din is the distance between the optical axes of the object-side lens units, and Dout is the distance between the optical axes of the image-side lens units.

6. The stereoscopic optical system according to claim 1, wherein the following inequality is satisfied:

$$1.40 \le Fno \le 6.50$$

where Fno is an F-number of each of the two optical systems.

7. The stereoscopic optical system according to claim 1, wherein the following inequality is satisfied:

$$0.25 \leq RCa/RCb \leq 0.48$$

where in each of the two optical systems, RCa is a distance from an optical axis of each optical system to a light shielding portion of the field stop configured to reduce the light amount, and Rcb is a maximum aperture diameter of a portion of the field stop where the light shielding portion is not provided.

8. The stereoscopic optical system according to claim 1, wherein the following inequality is satisfied:

$$0.20 \leq dRC/sk < 1.00$$

where in each of the two optical systems, dRC is a distance on an optical axis from the field stop to an image plane, and sk is a distance on the optical axis from a surface on an image side of a lens having a refractive power and disposed closest to the image plane in each optical system to the image plane.

9. The stereoscopic optical system according to claim 1, wherein third areas in the image circles of the two optical systems between the first area and the second area are close or adjacent to each other.

10. An image pickup apparatus comprising:

a single image sensor; and a stereoscopic optical system that includes two optical systems arranged in parallel and configured to form image circles of the two optical systems on the image sensor, wherein each of the two optical systems has an angle of view in which an image from one optical system is formed in a first area at an outer peripheral portion in an image circle of another optical system, wherein each of the two optical systems includes a field stop configured to reduce a light amount in a second area at an inner peripheral portion in the image circle in the parallel arrangement direction, wherein each of the field stops is disposed between the image sensor and a lens which is arranged closest of the image sensor in the optical system, and wherein a distance between centers of the image circles of the two optical systems is shorter than a diameter of each image circle on the image sensor, and at least part of each first area is located outside the image sensor.

* * * * *